(12) United States Patent
Hunt et al.

(10) Patent No.: US 7,786,820 B2
(45) Date of Patent: Aug. 31, 2010

(54) TUNABLE DIELECTRIC RADIO FREQUENCY MICROELECTROMECHANICAL SYSTEM CAPACITIVE SWITCH

(75) Inventors: Andrew Tye Hunt, Atlanta, GA (US); Ioannis (John) Papapolymerou, Decatur, GA (US); Todd A. Polley, Suwanee, GA (US); Guoan Wang, Atlanta, GA (US)

(73) Assignee: nGimat Co., Atlanta, GA (US)

( * ) Notice: Subject to any disclaimer, the term of this patent is extended or adjusted under 35 U.S.C. 154(b) by 0 days.

(21) Appl. No.: 11/374,815

(22) Filed: Mar. 14, 2006

(65) Prior Publication Data

US 2006/0208823 A1    Sep. 21, 2006

Related U.S. Application Data

(60) Provisional application No. 60/663,606, filed on Mar. 21, 2005.

(51) Int. Cl.
*H01P 5/04*    (2006.01)

(52) U.S. Cl. ............... 333/24 C; 333/161; 333/205; 333/262

(58) Field of Classification Search ............ 333/24 C, 333/161, 205, 262
See application file for complete search history.

(56) References Cited

U.S. PATENT DOCUMENTS

| | | | | |
|---|---|---|---|---|
| 5,427,988 | A | * | 6/1995 | Sengupta et al. ............ 501/137 |
| 6,133,807 | A | * | 10/2000 | Akiyama et al. ............ 333/101 |
| 6,355,534 | B1 | * | 3/2002 | Cheng et al. ................ 438/379 |
| 6,686,814 | B2 | | 2/2004 | Chiu et al. |
| 6,903,633 | B2 | | 6/2005 | Zhu et al. |
| 6,986,955 | B2 | | 1/2006 | Schmitt et al. |
| 2002/0165080 | A1 | | 11/2002 | Sengupta et al. |
| 2003/0146806 | A1 | * | 8/2003 | Nuecther et al. ............ 333/156 |
| 2004/0036558 | A1 | * | 2/2004 | Allison et al. ............... 333/205 |
| 2004/0150939 | A1 | | 8/2004 | Huff |
| 2006/0125746 | A1 | | 6/2006 | Sallese et al. |

FOREIGN PATENT DOCUMENTS

WO    WO 02/49143    6/2002

OTHER PUBLICATIONS

The RF and Microwave Handook Editor-in-Chief Mike Golio CRC Press LL, Boca Raton, FL, 2001. ISBN 0-8493-8592-X [excert].
Nishijima et al. "A Low-Voltage High Contact Force RF-MEMS Switch" 2004 IEEE MTT-S-Digest, pp. 577-580.
Brown, "RF-MEMS Switches for Reconfigurable Integrated Circuits" IEEE Transactions on Microwave Theory and Techniques, vol. 46 No. 11 Nov. 1998.
Sallese et al., "Switch and rf Ferroelectric MEMS: a New Concept" Sensors and Actuators A, vol. 109, pp. 1886-1894 (2004).

* cited by examiner

*Primary Examiner*—Benny Lee
(74) *Attorney, Agent, or Firm*—William M. Brown

(57) ABSTRACT

The invention is a tunable RF MEMS switch developed with a BST dielectric at the contact interface. BST has a very high dielectric constant (>300) making it very appealing for RF MEMS capacitive switches. The tunable dielectric constant of BST provides a possibility of making linearly tunable MEMS capacitive switches. The capacitive tunable RF MEMS switch with a BST dielectric is disclosed showing its characterization and properties up to 40 GHz.

12 Claims, 9 Drawing Sheets

TUNABLE DIELECTRIC RADIO FREQUENCY MICROELECTROMECHANICAL SYSTEM CAPACITIVE SWITCH

PRIORITY

Applicants claim priority benefit of U.S. Provisional Patent Application No. 60/663,606 filed 21 Mar. 2005.

FIELD OF THE INVENTION

The present invention is directed to a tunable RF MEMS (Radio Frequency, MicroElectroMechanical Systems) capacitive switch. In particular, the invention is directed to a tunable RF MEMS switch developed with a variable dielectric, such as BST (Barium Strontium Titanate), at the contact interface. BST has a very high dielectric constant (>300) making it very appealing for RF MEMS capacitive switches. The tunable dielectric constant of BST provides linearly tunable MEMS capacitive switches. The invention is directed to a tunable RF MEMS capacitive switch, preferably with a BST dielectric, and its characterization and properties up to 40 GHz.

BACKGROUND OF THE INVENTION

RF MEMS switch technology has been introduced during the last 10-15 years as a prime candidate to replace the conventional GaAs FET and p-i-n diode switches in RF and microwave communication systems, mainly due to their low insertion loss, good isolation, linear characteristics and low power consumption. It has also provided the way for the development of novel revolutionary RF circuits that can be used in the next generation of broadband, wireless, and intelligent communication and radar systems. Recently, many researchers have been focusing on the development of miniaturized, low power and low cost, RF/Microwave circuits with RF MEMS switches. MEMS switches have been used in different RF circuit applications: tunable microwave filters, tunable phase shifters, tunable antennas and tunable matching networks. Microwave and millimeter-wave technology that offers wide tunability is essential for today's cost-driven commercial and military industries. In order to meet the above requirements, recently, micromachined tunable capacitors have been shown to have an adequate Q-factor when they are fabricated in either an aluminum or a polysilicon surface micromachining technology. Also, a three-plate structure with a wide tuning range has been reported.

Tunable capacitors are enabling components for millimeter-wave systems. There are two approaches to make such components. One is a compositional approach that improves properties of the materials, and the other is a physical approach that controls the gap or area of the dielectric layer for variable capacitance. MEMS switches' precise, micrometer-level movements are ideal drives for the physical approach. A MEMS-based switching diaphragm can be used as a variable capacitor. The tunability of this component is very impressive because an ultra-low loss, 2 μm air gap is used for the dielectric layer. However, the range of this variable capacitance is limited when the top member collapses onto the bottom plate.

SUMMARY OF THE INVENTION

Emerging BST thin film technology is being investigated for enhancing RF-MEMS capacitive switches due to BST's comparatively high dielectric constant ($\epsilon_r$>300). In the present invention, a capacitive RF tunable MEMS switch with a variable dielectric material, such as BST, as the dielectric layer is provided. It provides continuous (analog) tunability of the capacitor after the MEMS switch has been pulled down (closed), due to voltage-controlled properties of the BST dielectric material. The switch can be used to develop very compact digital capacitor banks with enhanced analog tuning for a variety of reconfigurable networks (e.g. filters, tuners). A special MEMS design with a separate actuation electrode provides tunability of the switch and prevents the breakdown problem of the BST.

This invention provides a clamped-free (cantilever-type) coplanar waveguide (CPW) switch. A demonstration device made as described hereinafter has a contact area of 100 μm×200 μm. These switches were fabricated on sapphire substrates using a five-mask process.

DETAILED DESCRIPTION OF THE PREFERRED EMBODIMENTS

The present invention may be understood more readily by reference to the following detailed description of preferred embodiments of the invention and the figures.

Figure 1A:
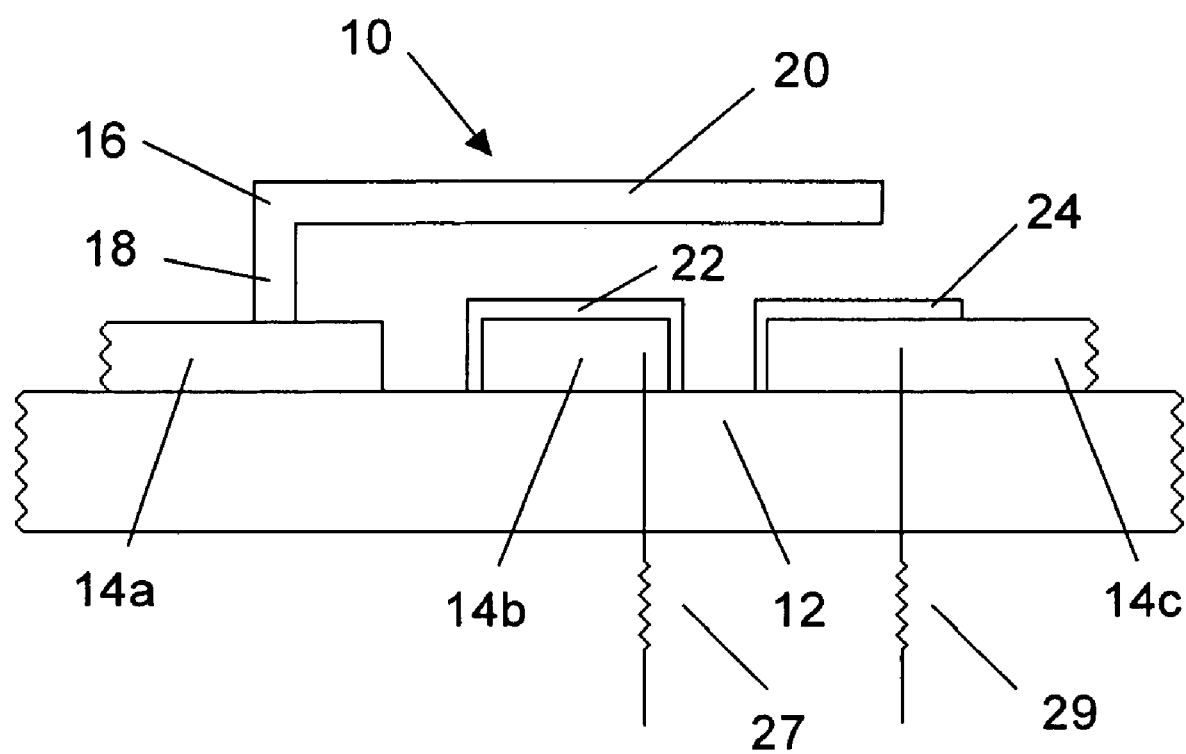
FIGS. 1a and 1b show an RF tunable cantilever capacitive switch using BST thin film with a separate actuation electrode in both switch-up (FIG. 1a) and switch-down (FIG. 1b) states.
Figure 1B:
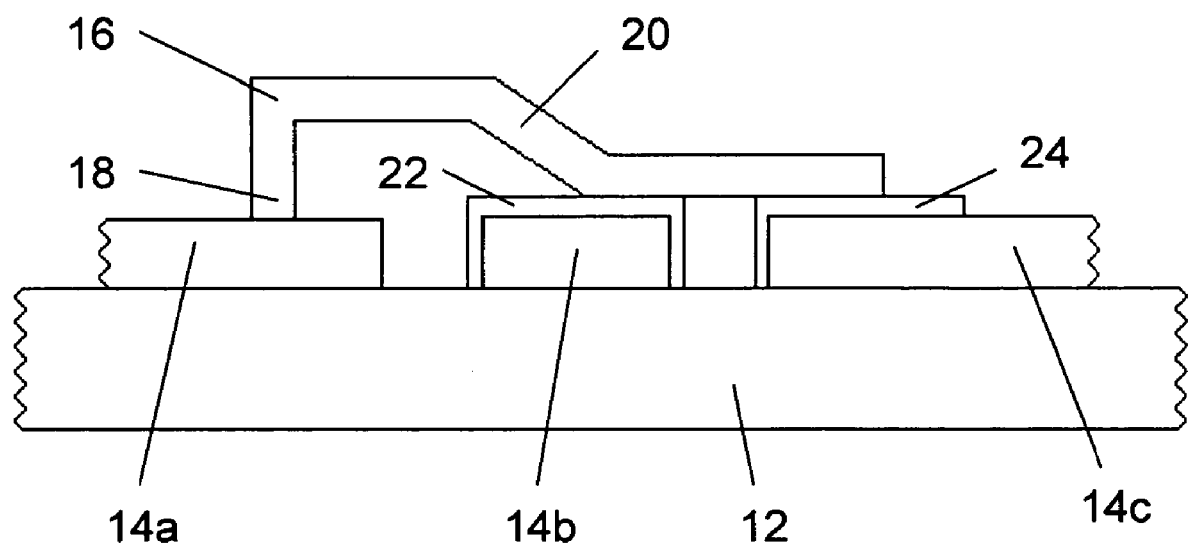

FIGS. 1a and 1b show the designed CPW cantilever capacitive switch 10 in both up (FIG. 1a) and down (FIG. 1b) switch states.

The switch 10 (FIG. 1A) is formed on a substrate 12 of insulating material, such as sapphire or silicon. Improved BST can be formed on a substrate that has a lattice structure appropriate for growth thereon of epitaxial or near-epitaxial BST. Conductive material, such as platinum, on the upper surface of the substrate 12, forms circuitry traces 14a, 14b, and 14c. In this switch 10 (FIG. 1A), the capacitive circuitry is between traces 14a and 14c, and trace 14b is connected to an isolated electrical circuit by which an electrostatic field may be created. For clarity, there are connections to 14a and 14c, so that the devices of the present invention can be used in a wide range of electronic applications known to those of skill in the art, including time delays, tunable filters, and phase shifters.

Fabricated on trace 14a is a cantilever member 16, including an upright section 18 and a flexible foil arm 20 that is capable of being flexed between the "up" or "open" position of FIG. 1a and the "down" or "closed" position of FIG. 1b. The cantilever member 16 is preferably formed as a unitary structure from a metal, such as gold or of multiple layers of metal. The foil arm must be bendable to the closed position and resume its unbent open position through multiple openings and closings.

A layer 22 of insulating material is formed on trace 14b. This layer 22 is intended to prevent electrical contact between the foil arm 20 and electrostatic charge trace 14b, yet be of a material and of appropriate thickness to transmit the electrostatic field of trace 14b to the foil arm 20.

The capacitor dielectric layer 24 is formed on trace 14c, and when the switch 10 is in the down or closed position of FIG. 1b, a capacitor is formed that includes conductive foil arm 20, dielectric material layer 24, and conductive circuitry trace 14c.

In a very much-preferred aspect of the present invention, the dielectric material of layer 24 is tunable by applying an electrical potential across the material through circuitry trace 14c. The preferred dielectric material for this layer is barium strontium titanate, $Ba_xSr_{1-x}TiO_3$ where x is between 0.1 and 0.9, preferably between 0.4 and 0.6. Other ferroelectrics or materials, such as bismuth zinc niobate, and artificial dielectrics can also be used. For non-tunable MEMS capacitive switches, non-tunable material, such as silicon nitride (SiN) may be used as the dielectric material layer 24.

The switch 10 is designed for a very low capacitance between the top membrane and the bottom signal line in the up state. Once voltage is applied through the actuation electrode (i.e., electrostatic charge trace 14b), the top membrane is deflected due to electrostatic forces and as it touches the bottom electrode, a larger metal-insulator-metal capacitor is formed. The down-state capacitance of the design is highly enhanced by the use of high dielectric constant BST material.

It is preferred that the low frequency control voltage that actuates switching between the up and down (open and closed) states be isolated from the RF circuitry. This may be accomplished by one or more high resistance resistors, i.e. 10,000 ohms and upward. The resistor(s) are preferably integrated high value thin film resistors. Shown (FIG. 1a) connected to circuitry trace 14b is a resistor 27. Shown (FIG. 1a) connected to circuitry trace 14c is a resistor 29. Examples of thin film resistors and their formation are found in U.S. Pat. Nos. 6,210,592, 6,208,234, 6,500,350 and 6,329,899.

Deposition and Properties of BST Thin Film

Ferroelectric material is a category of material with reorientable spontaneous polarization, a sub-category of pyroelectric materials. Because of their high dielectric constant, the electric field dependence and the temperature dependence of their dielectric constant, and high breakdown voltage, ferroelectric materials have a wide range of applications such as IR detection, high-density capacitors, DRAMs, non-volatile ferroelectric memory, and high frequency microwave devices. $Ba_xSr_{1-x}TiO_3$ (BST) has been the subject of extensive investigation for these applications.

$Ba_{0.45}Sr_{0.55}TiO_3$ films were prepared by using the combustion chemical vapor deposition (CCVD), such as described in WO 02/07966 published 31 Jan. 2002. In the liquid solution CCVD process, precursors, which are the metal-bearing chemicals used to coat an object, are dissolved in a solution, which typically is a combustible fuel. This solution is atomized to form microscopic droplets by means of an atomizer; one such atomizer is the Nanomiser® device by nGimat Co., Atlanta, Ga. These droplets are then carried by an oxygen-containing stream to the flame where they are combusted. A substrate (the material being coated) is coated by simply drawing it in front of the flame. The heat from the flame provides the energy required to vaporize the droplets and for the precursors to react and vapor deposit (condense) on the substrates. One of the strengths of the CCVD process is the variety of complex materials and substrates that can be utilized.

Fabrication of the Switches

Fabrication of the device is described with reference to FIGS. 2a-2e. Due to the high growth temperature (900° C.) of BST, platinum electrodes are used as the bottom electrodes (14a, 14b, 14c) in the BST thin film deposition. Because Pt is very hard to pattern using wet etching, a lift off process is first used to pattern Ti/Pt (200 Å/1000 Å) on the sapphire (aluminum oxide) substrate 12 before the BST deposition. The BST layer is then deposited, patterned and etched in a diluted HF solution with an etching rate of 500 Å per minute to form the dielectric layer 24 on circuitry trace 14c, thereby forming the structure illustrated in FIG. 2a.

Figure 2A:
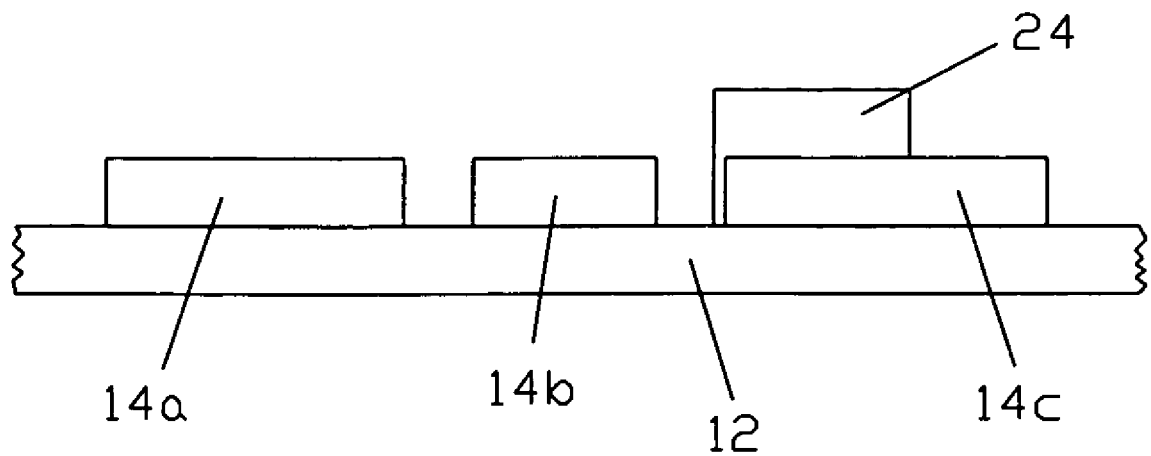
FIGS. 2a, 2b, 2c, 2d and 2e illustrate steps of fabricating the switch of FIGS. 1a and 1b.
Figure 2B:
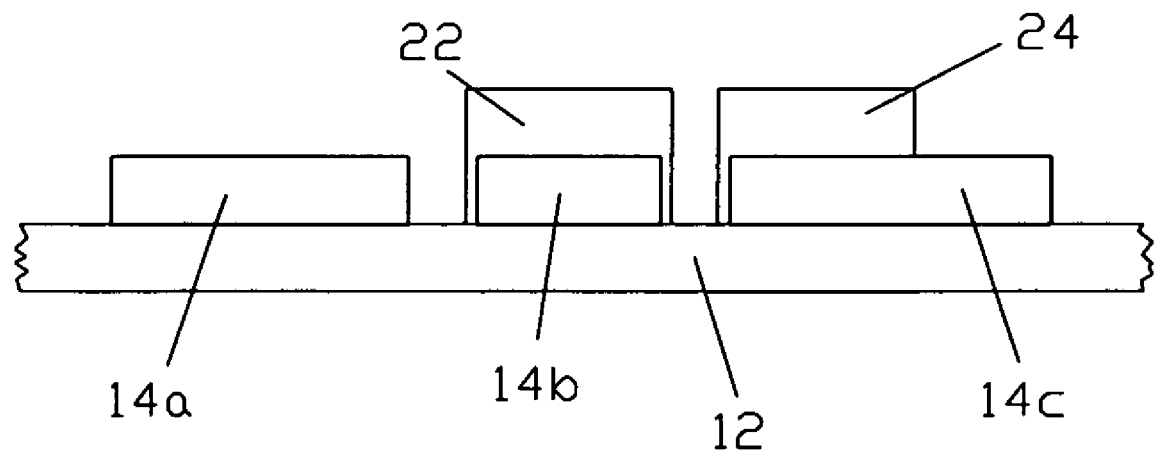

A 2000 Å Silicon Nitride layer is then deposited by PECVD (plasma enhanced chemical vapor deposition) and patterned using RIE (reactive ion etching) for the actuation electrode comprising circuitry trace 14b overlaid with SiN 22, giving the structure shown in FIG. 2b.

Figure 2C:
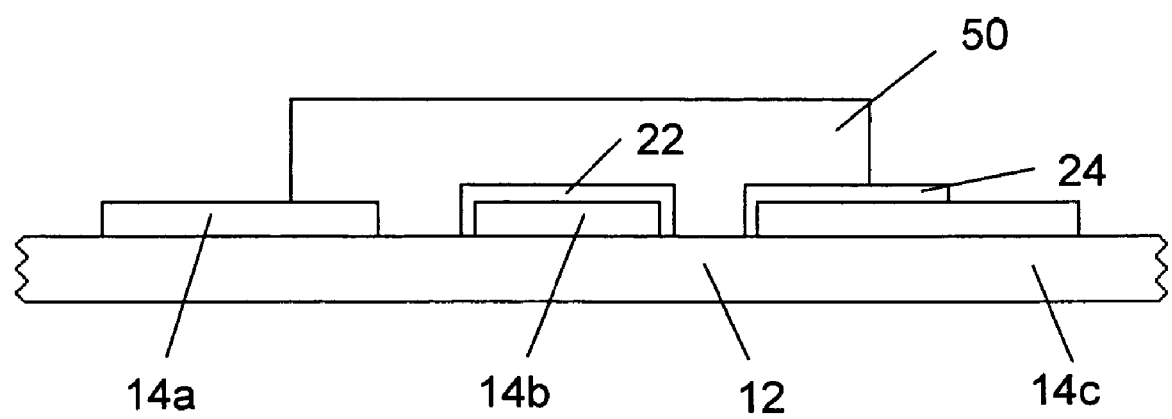

A 2 μm thick photoresist (Shipley S-1813 Microposit®) "sacrificial" layer 50 is then spin coated and patterned to define the air-gap. This patterned structure is shown in FIG. 2c.

Figure 2D:
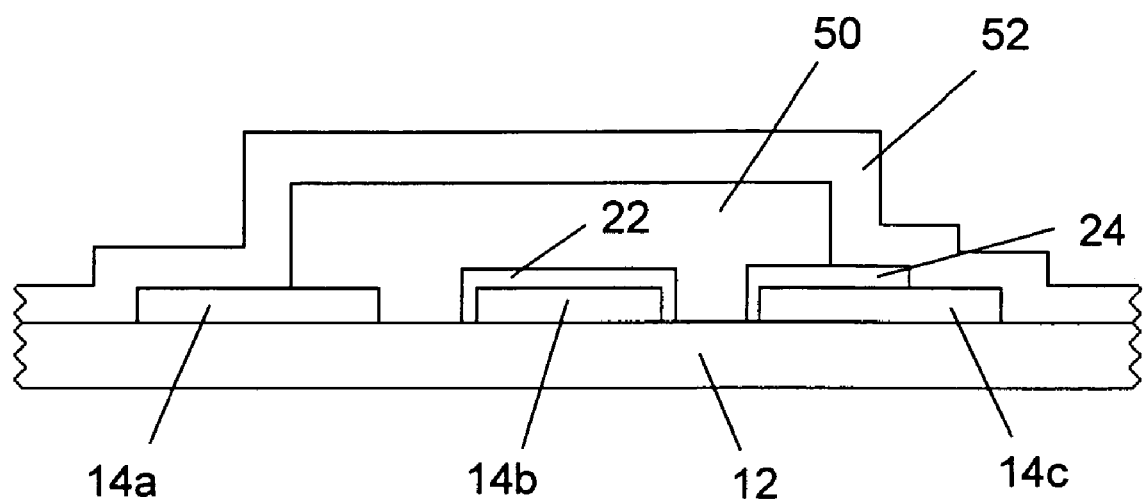

A Ti/Au/Ti (200 Å/3000 Å/200 Å) seed layer 52 is then plasma vapor evaporated to form the structure shown in FIG. 2d.

Figure 2E:
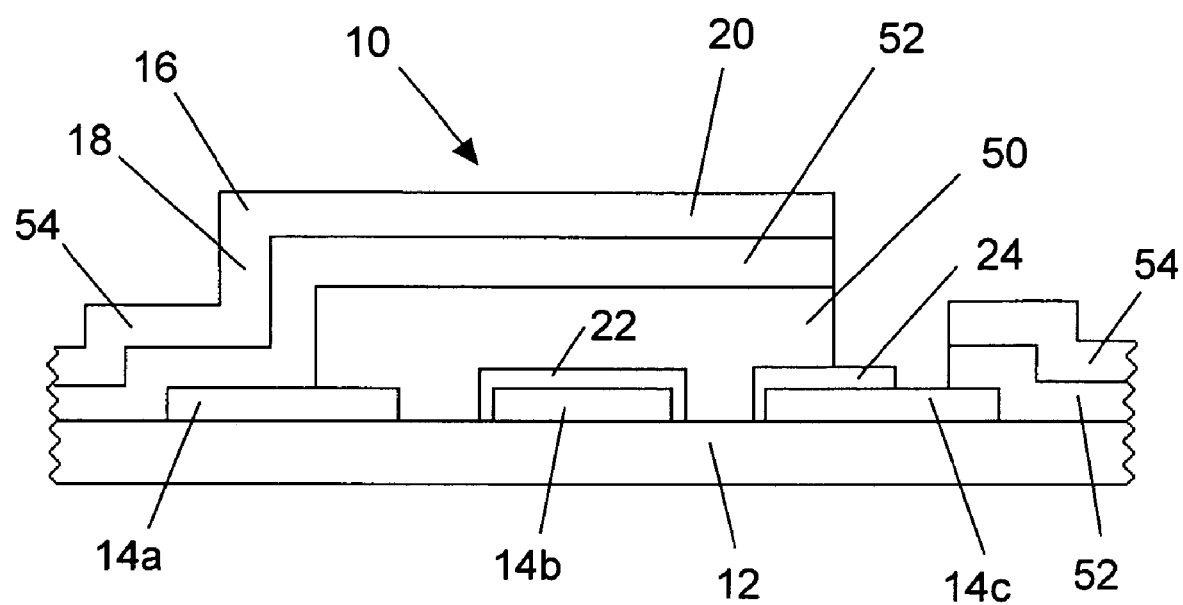

This seed layer 52 is then patterned and electroplated to form layer 54 and the resulting cantilever member 16, this structure being shown in FIG. 2e. The seed layer 52, between dielectric material layer 24 and conductive foil arm 20 is covered during electroplating or is removed prior to electroplating, so that after removing the sacrificial photoresist layer 50, this section of the seed layer is not present or washed away.

Finally, after removing the sacrificial photoresist layer with resist stripper, the stripper and rinse fluids are removed by a drying process and then the metal is released to form the switch as previously described in reference to FIGS. 1a and 1b.

It is to be understood that the process is used to produce a plurality of MEMS CPW switches simultaneously, and these can be integrated into a wide range of devices.

Figure 3:
FIG. 3 shows an SEM of a fabricated cantilever type CPW switch on sapphire (left side) with a 200 nm BST layer (bottom right) and 1.2 μm-thick Au foil (top right).
Figure 4:
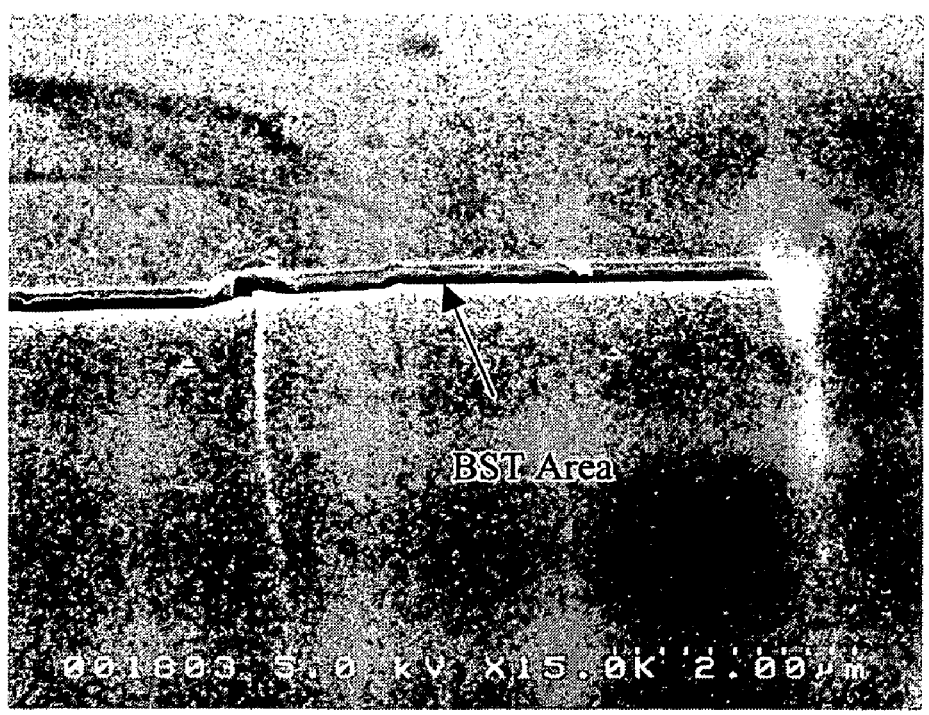
FIG. 4 shows an SEM close-up view of a deposited BST thin film that forms the dielectric layer of the capacitive switch.

A Scanning Electron Microscope (SEM) picture of the fabricated cantilever type CPW switch structure with a 1.2 μm thick gold membrane, a 2 μm air-gap and a contact area of 100×200 μm² ((0.02 mm²) is shown in FIG. 3. With reference to FIG. 1a, FIG. 3 is from the right, looking to the left. The metal in the foreground is 14c. The membrane is 20. The BST layer, 24, is under the membrane and to the left of the image. The BST layer is illustrated in FIG. 4. This figure is a high-magnification view of the center of FIG. 3. With reference to FIG. 1a, the metallization 14 is seen in the lower and right section of the image and the BST layer 24 crosses the metallization; the arrow indicates the edge of 24.

Performance Results

Figure 5:
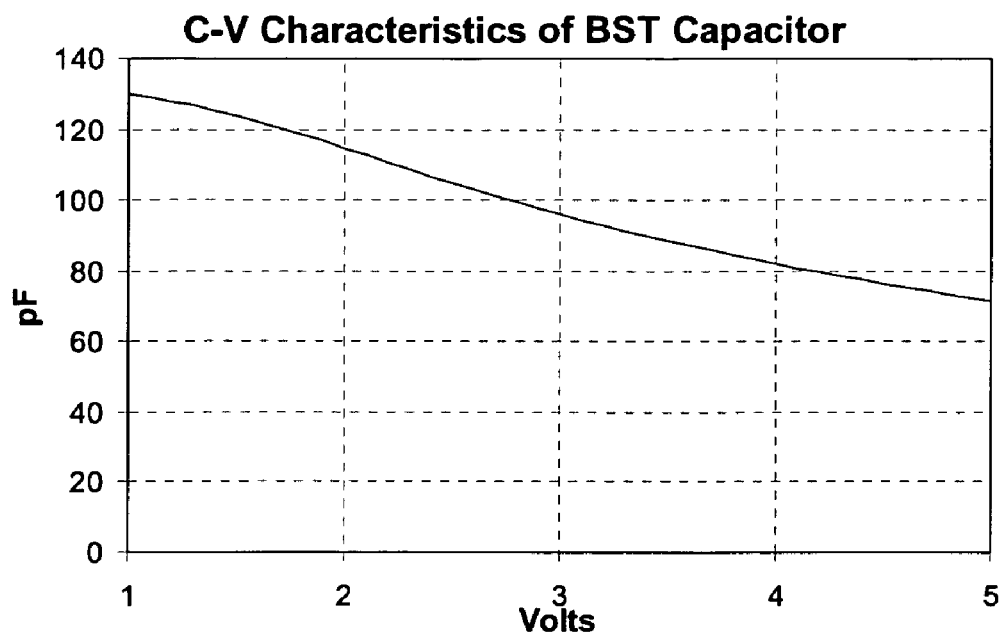
FIG. 5 shows the capacitance-voltage (C-V) characteristic of a MEMS capacitive switch with a BST dielectric layer at the down (closed) state.
Figure 6A:
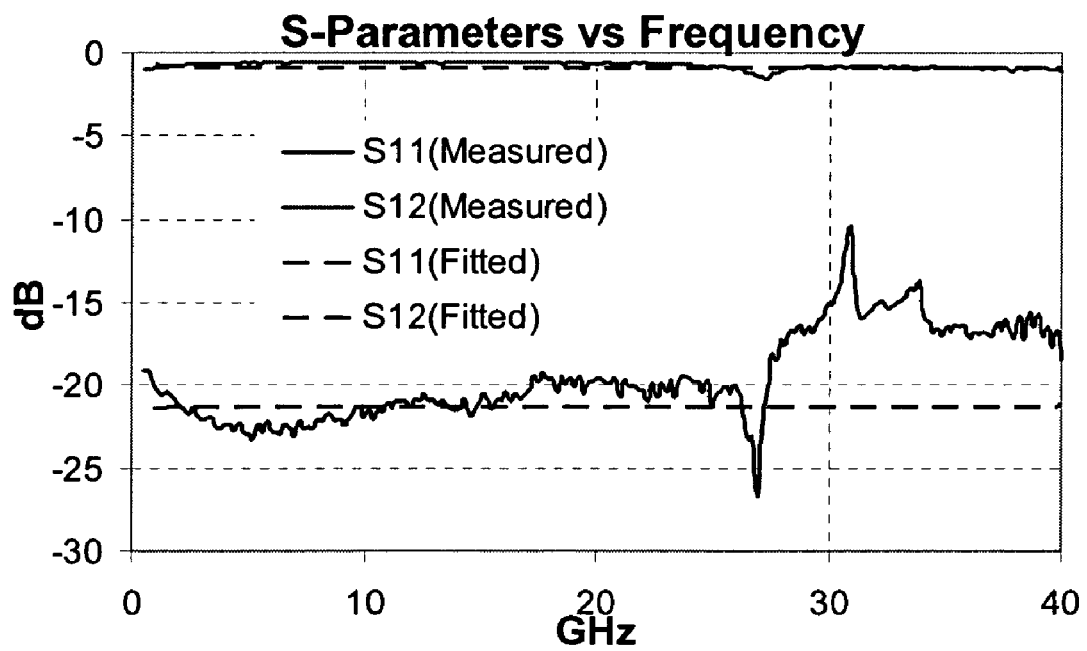
FIG. 6a shows the measured S-parameters of the MEMS switch with BST dielectric layer in the down-state (closed) position.
Figure 6B:
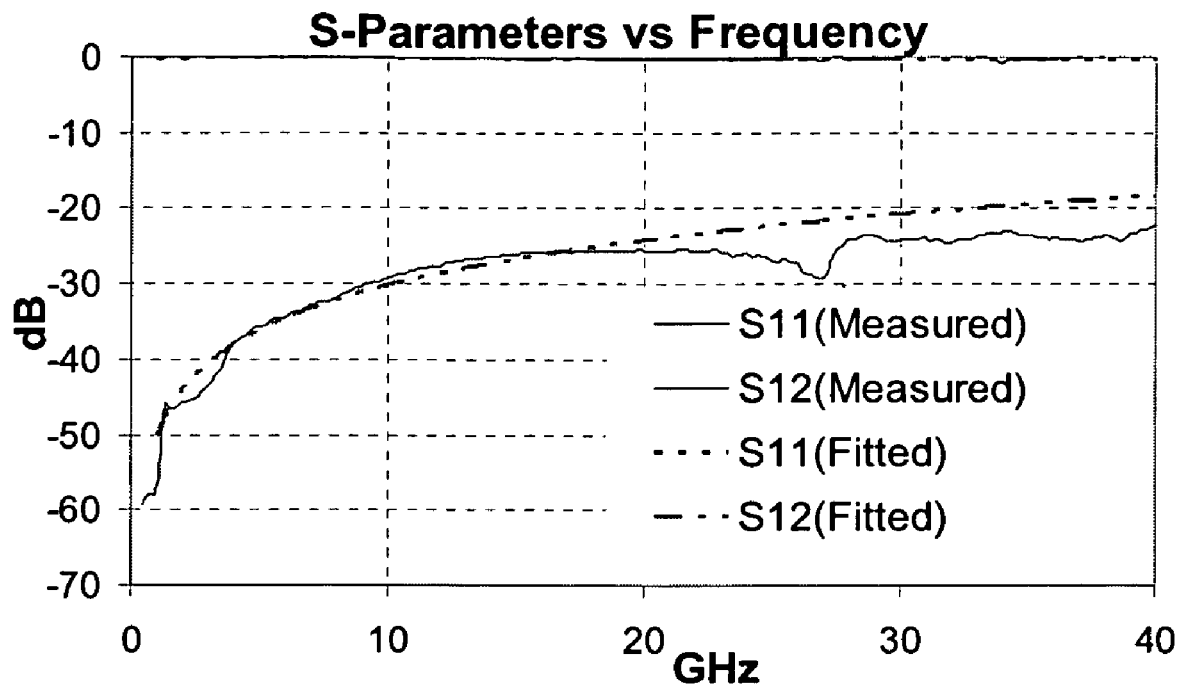
FIG. 6b shows the measured S-parameters of the MEMS switch with BST dielectric layer in the up-state (open) position.

FIG. 5 shows the C-V characteristic and the tunability of the BST MEMS switches at the down state using a Keithley 590 CV station. This figure illustrates the tuning capability of the BST capacitor from ~130 pF down to ~70 pF, as the tuning voltage was changed from about 1 to about 5 V. The tunable range is 182%. The measured Q-factor is 260. A different capacitance range can be achieved with a different area. S-parameter measurements of the cantilever switch were taken using an Agilent 8510 network analyzer. A TRL (thru-reflect-line) calibration was performed to de-embed the coplanar line and transition losses. Measured results of switch at both up and down state positions are shown in FIG. 6. The pull-down voltage was measured to be 45 to 50 volts. The insertion loss in the up state is −0.3 dB at 20 GHz and −0.4 dB at 40 GHz, while the isolation is −25 dB at 20 GHz. An equivalent LCR circuit was used to fit the measured data. The fitted up state capacitance is 10 fF, the series inductance and the series resistance of the switch are 5 pH and 0.5Ω, respectively. FIG. 6a shows an insertion loss of less than or about 1 dB, and a return loss of generally more than 15 dB. FIG. 6b shows that there was no through signal.

In the down state position, the insertion loss is −0.6 dB up to 40 GHz with a little bit of fluctuation between 26.6 GHz and 28.2 GHz, while more than 20 dB return loss is achieved from DC up to 26 GHz. The fitted down state capacitance and series inductance are 120 pF and 5 pH, the series resistance is 0.3 O. The insertion loss is slightly higher when compared with other MEMS switches, because the signal lines of the switch are only 1000 Å thick. A much lower loss can be achieved by increasing the thickness of the Pt layer.

Figure 7:
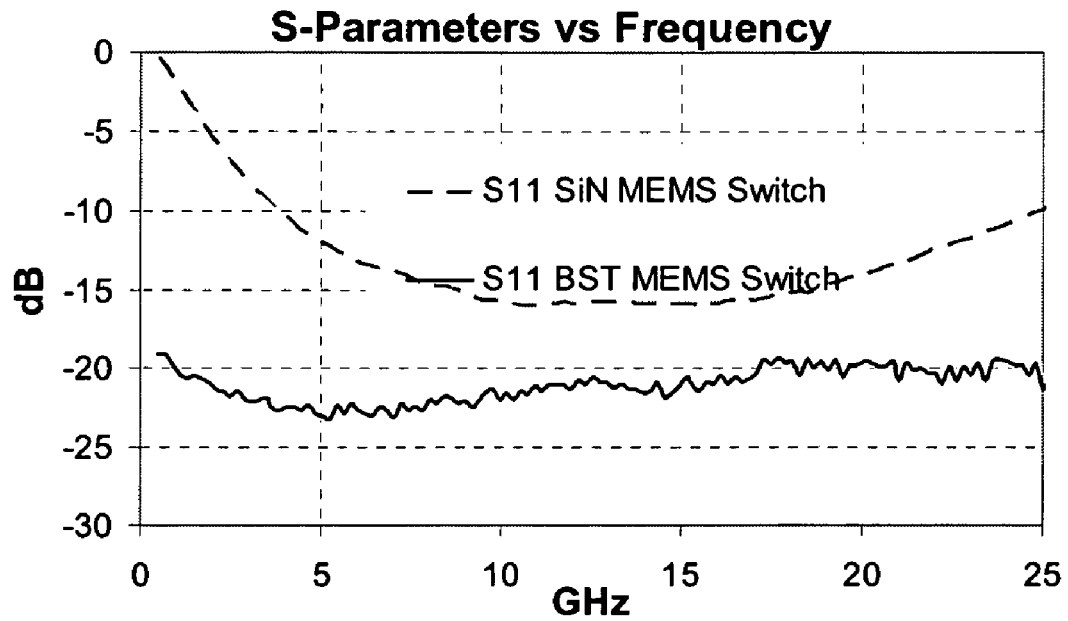
FIG. 7 shows a comparison between BST and SiN switches, i.e., switches having these materials as the capacitor dielectric.

To further understand the BST MEMS switches performance, switches of the same physical structure and size with silicon nitride as the dielectric layer were fabricated and measured. FIG. 7 shows the down state return loss of both BST and $Si_3N_4$ MEMS switches. This figure shows that the BST MEMS switch has a higher performing return loss than the $Si_3N_4$ MEMS switch. From the comparison we can see that BST switches have higher return loss than that of the $Si_3N_4$ switches. This is because the BST switch capacitance is much higher due to the higher dielectric constant.

In this invention, tunable MEMS capacitive switches with emerging variable dielectric, e.g., BST, thin film technology is realized. An excellent insertion loss of −0.6 dB was obtained in a frequency range from 0.5 GHz to 40 GHz, while the return loss is less than −20 dB up to 26 GHz. Tunability of the BST switches was also achieved for the first time. Measured results show that the capacitance of the BST MEMS switch can change 182% when the applied voltage ranges from 1 to 5 volts. The proposed RF MEMS switch can be used for the development of compact, low loss tunable digital capacitor banks for reconfigurable microwave circuits. The hybrid scheme of tunability (digital and analog) is expected to provide more design flexibility for compact reconfigurable RF front ends. There are a wide range of MEMS designs and processing methods that can be used to form the desired switches. Most of these designs have contact areas of 0.1 mm$^2$ or less, preferably 0.001 mm$^2$ or less.

The MEMS capacitive switches of the present invention are useful in a variety of electronic applications. The switches can be used within devices such as delay lines, tunable filters or phase shifters to switch in additional capacitance ranges or to modify function better and different frequencies or bandwidths.

Multiple switches can enable further functional changes in a device.

The switches may serve multiple purposes in an electronic circuit, e.g., as both a time delay line and a tunable filter.

Because the MEMS switch may be used in a variable capacitance device, it can be used simply as a high return loss switch on the same wafer with no additional processing steps. After completion of a wafer containing multiple MEMS switches, the multiple switches may be incorporated into the variable dielectric integrated device. Or multiple switches may be diced out of the same wafer to be used in a plurality of separate devices.

What is claimed is:

1. A variable radio frequency capacitor device comprising a first electrode, a variable dielectric material layer, and a second electrode, to complete an electrical circuit with the first electrode, said first electrode being switchable between a closed position in electrical contact with said dielectric material layer and an open position out of electrical contact with said dielectric material layer, and a third electrode that carries a first control voltage to switch said first electrode from said open to said closed position, the properties of said dielectric material of said layer being variable and controlled by a second control voltage, so as to cause a change in the response of the radio frequency device.

2. The device of claim 1 wherein the device functions as part of a phase shifter.

3. The device of claim 1 wherein the device functions as a high frequency switch.

4. The device of claim 1 wherein the variable dielectric is a ferroelectric.

5. The device of claim 4 wherein said ferroelectric is barium strontium titanate.

6. The device of claim 1 wherein said first electrode has a resilient, flexible member that is flexed between said open position and said closed position, according to said first control voltage.

7. The device of claim 6 wherein said first electrode is in the closed position, according to said first control voltage, and the second control voltage causes the impedance of the radio frequency signal device to vary.

8. The device of claim 1 wherein the variable dielectric is bismuth zinc niobate.

9. The device of claim 1 wherein the variable dielectric is an artificial dielectric.

10. The switch of claim 1 wherein the first control voltage is isolated from the electrical circuit containing the first and second electrodes, by use of an integrated high resistance value thin-film resistor.

11. The device of claim 1 wherein the device functions as part of a tunable filter.

12. The device of claim 1 wherein the device functions as part of a time delay line.

* * * * *